(12) United States Patent
Moussavi

(10) Patent No.: US 12,600,259 B2
(45) Date of Patent: Apr. 14, 2026

(54) SYSTEM AND METHOD FOR ELECTRICALLY CHARGING MOTOR VEHICLES

(71) Applicant: CHARGEPOLY, Aix-en-Provence (FR)

(72) Inventor: Hadi Moussavi, Aix-en-Provence (FR)

(73) Assignee: CHARGEPOLY, Aix-en-Provence (FR)

( * ) Notice: Subject to any disclaimer, the term of this patent is extended or adjusted under 35 U.S.C. 154(b) by 736 days.

(21) Appl. No.: 17/609,685

(22) PCT Filed: May 12, 2020

(86) PCT No.: PCT/EP2020/063115
§ 371 (c)(1),
(2) Date: Nov. 8, 2021

(87) PCT Pub. No.: WO2020/229439
PCT Pub. Date: Nov. 19, 2020

(65) Prior Publication Data
US 2022/0227243 A1     Jul. 21, 2022

(30) Foreign Application Priority Data

May 14, 2019     (FR) ...................................... 1904994

(51) Int. Cl.
B60L 53/67          (2019.01)
B60L 53/14          (2019.01)
(Continued)

(52) U.S. Cl.
CPC .............. B60L 53/67 (2019.02); B60L 53/62 (2019.02); H02J 1/001 (2020.01); H02J 1/106 (2020.01); B60L 53/14 (2019.02); B60L 53/22

(2019.02); *B60L 53/305* (2019.02); *B60L 53/31* (2019.02); *B60L 53/60* (2019.02); *B60L 53/66* (2019.02); *H02J 1/109* (2020.01); *H02J 7/40* (2026.01);
(Continued)

(58) Field of Classification Search
CPC ...... B60L 53/126; B60L 53/305; B60L 53/62; B60L 53/66; B60L 53/60; B60L 53/67; Y02T 10/70; Y02T 10/7072; Y02T 90/12; H02J 1/001; H02J 1/106
USPC ......................................................... 320/109
See application file for complete search history.

(56) References Cited

U.S. PATENT DOCUMENTS 5,642,270  A  *  6/1997  Green ..................... B60L 53/11
                                                    363/17
5,803,215  A  *  9/1998  Henze ..................... B60L 53/14
                                                    320/109
(Continued)

FOREIGN PATENT DOCUMENTS

DE        102015225980 A1    6/2017
DE        102017128092 B3    2/2019
WO        2018140886 A1      8/2018

*Primary Examiner* — John T Trischler
(74) *Attorney, Agent, or Firm* — IP Attorneys Group, LLC

(57)     ABSTRACT

The charging system comprises: two chargers which deliver instantaneous electrical energy for charging an electrical device; an electrical chain which links the two chargers; three charging points that are electrically connected to the chargers via the electrical chain; a switching system which connects or does not connect a charging point to the first or to the second charger; a control system which controls the switching system.

11 Claims, 8 Drawing Sheets

1: Charging System
2a-2b: Chargers
3: Electric Chain
4a-4h: Charging Terminals
5a-5h: Charging Locations
6: Switching System
7a-7b: Switching Devices
8: Control System

(51) Int. Cl.

| | |
|---|---|
| B60L 53/22 | (2019.01) |
| B60L 53/62 | (2019.01) |
| H02J 1/00 | (2006.01) |
| H02J 1/10 | (2006.01) |
| H02J 7/70 | (2026.01) |
| *B60L 53/30* | (2019.01) |
| *B60L 53/31* | (2019.01) |
| *B60L 53/60* | (2019.01) |
| *B60L 53/66* | (2019.01) |
| *H02J 7/40* | (2026.01) |
| *H02J 7/42* | (2026.01) |

(52) U.S. Cl.
CPC . *H02J 7/42* (2026.01); *H02J 7/70* (2026.01); *Y02T 10/7072* (2013.01); *Y02T 90/12* (2013.01)

(56) References Cited

U.S. PATENT DOCUMENTS

| 7,256,516 | B2 * | 8/2007 | Buchanan | H01M 10/441 |
| | | | | 307/62 |
| 8,446,124 | B2 * | 5/2013 | Nagy | B60L 53/63 |
| | | | | 320/109 |
| 8,633,670 | B2 * | 1/2014 | Choi | H02J 3/46 |
| | | | | 320/101 |
| 8,643,330 | B2 * | 2/2014 | Nergaard | H02J 7/0013 |
| | | | | 320/109 |
| 8,698,451 | B2 * | 4/2014 | King | B60L 9/22 |
| | | | | 320/109 |
| 8,704,496 | B2 * | 4/2014 | Kimura | H02J 7/04 |
| | | | | 702/63 |
| 8,810,198 | B2 * | 8/2014 | Nergaard | B60L 53/63 |
| | | | | 320/109 |
| 8,890,474 | B2 * | 11/2014 | Kim | B60L 53/65 |
| | | | | 320/109 |
| 8,952,656 | B2 * | 2/2015 | Tse | H02J 7/0013 |
| | | | | 320/109 |
| 8,981,718 | B2 * | 3/2015 | Caffy | B60L 53/67 |
| | | | | 320/124 |
| 9,026,347 | B2 * | 5/2015 | Gadh | B60L 53/67 |
| | | | | 320/132 |
| 9,126,489 | B2 * | 9/2015 | Herzog | B60L 53/14 |
| 9,148,027 | B2 * | 9/2015 | Shane | H02J 13/00024 |
| 9,150,114 | B2 * | 10/2015 | Endo | H02J 7/0068 |
| 9,168,841 | B2 * | 10/2015 | Kawai | H02J 7/04 |
| 9,184,618 | B2 * | 11/2015 | Endo | B60L 53/80 |
| 9,209,638 | B2 * | 12/2015 | Bouman | B60L 53/20 |
| 9,371,007 | B1 * | 6/2016 | Penilla | G06Q 30/0259 |
| 9,493,082 | B1 * | 11/2016 | Tse | B60L 53/14 |
| 9,555,715 | B2 * | 1/2017 | Sugano | B60L 53/30 |
| 9,592,742 | B1 * | 3/2017 | Sosinov | B60L 53/68 |
| 9,673,654 | B2 * | 6/2017 | Beauregard | B60L 53/11 |
| 9,698,598 | B2 * | 7/2017 | Ballatine | B60L 53/54 |
| 9,707,851 | B2 * | 7/2017 | Nonomura | B60L 53/14 |
| 9,751,416 | B2 * | 9/2017 | Hafner | B60L 53/30 |
| 9,770,993 | B2 * | 9/2017 | Zhao | B60L 53/51 |
| 9,789,780 | B2 * | 10/2017 | King | B60L 50/51 |
| 9,815,382 | B2 * | 11/2017 | Penilla | B60L 53/305 |
| 9,843,209 | B2 * | 12/2017 | Endo | H02J 7/007194 |
| 9,908,421 | B2 * | 3/2018 | Koolen | B60L 55/00 |
| 9,914,365 | B2 * | 3/2018 | King | B60L 9/22 |
| 10,093,193 | B2 * | 10/2018 | Ohkuma | B60L 53/305 |
| 10,243,384 | B2 * | 3/2019 | Chen | H02J 7/0045 |
| 10,293,699 | B2 * | 5/2019 | Zhao | B60L 58/15 |
| 10,369,890 | B1 * | 8/2019 | Sosinov | B60L 53/124 |
| 10,377,259 | B2 * | 8/2019 | King | B60L 7/12 |
| 10,399,461 | B1 * | 9/2019 | Sosinov | B60L 53/68 |
| 10,543,755 | B2 * | 1/2020 | King | H02J 7/0045 |
| 10,696,180 | B2 * | 6/2020 | Roggendorf | B60L 53/11 |
| 10,763,678 | B2 * | 9/2020 | Chan | B60L 53/665 |
| 10,800,279 | B2 * | 10/2020 | Bhat | B60L 53/14 |
| 10,807,485 | B2 * | 10/2020 | Koolen | B60L 53/62 |
| 10,836,273 | B2 * | 11/2020 | Zhu | B60L 53/20 |
| 10,836,275 | B2 * | 11/2020 | Zhu | B60L 53/62 |
| 10,960,784 | B2 * | 3/2021 | Herke | H02J 3/14 |
| 11,001,153 | B2 * | 5/2021 | Chen | B60L 50/50 |
| 11,007,885 | B2 * | 5/2021 | Koolen | B60L 55/00 |
| 11,034,255 | B2 * | 6/2021 | Ben David | H02J 7/02 |
| 11,101,681 | B2 * | 8/2021 | Kalkmann | H02J 7/02 |
| 11,135,931 | B2 * | 10/2021 | Martin | B60L 53/60 |
| 11,260,763 | B2 * | 3/2022 | Hou | B60L 53/16 |
| 11,264,798 | B2 * | 3/2022 | Brombach | H02J 1/102 |
| 11,292,352 | B1 * | 4/2022 | Keister | H02M 7/487 |
| 11,332,030 | B2 * | 5/2022 | Nishio | H02H 7/22 |
| 11,351,885 | B2 * | 6/2022 | Boehm | B60L 53/31 |
| 11,358,489 | B2 * | 6/2022 | Beaude | H02J 7/0013 |
| 11,375,656 | B2 * | 7/2022 | Thomson | H02J 7/00716 |
| 11,400,820 | B2 * | 8/2022 | King | B60L 58/16 |
| 11,400,826 | B2 * | 8/2022 | Ben David | B60L 53/31 |
| 11,458,850 | B2 * | 10/2022 | Graßl | B60L 53/16 |
| 11,470,764 | B2 * | 10/2022 | Aghai | H02M 3/33507 |
| 11,511,635 | B2 * | 11/2022 | Sosinov | B60L 53/35 |
| 11,511,639 | B2 * | 11/2022 | Brombach | B60L 53/16 |
| 11,648,844 | B2 * | 5/2023 | Keister | H02J 7/007194 |
| | | | | 320/109 |
| 11,691,528 | B2 * | 7/2023 | Ben David | B60L 53/31 |
| | | | | 307/10.1 |
| 11,794,599 | B2 * | 10/2023 | Slepchenkov | B60L 50/70 |
| 11,801,761 | B2 * | 10/2023 | Bouman | B60L 53/20 |
| 11,824,380 | B2 * | 11/2023 | Xu | H02M 3/1582 |
| 11,827,115 | B2 * | 11/2023 | Slepchenkov | B60L 9/00 |
| 11,865,935 | B2 * | 1/2024 | Chan | B60L 53/65 |
| 11,884,168 | B2 * | 1/2024 | King | B60L 50/40 |
| 11,884,177 | B2 * | 1/2024 | Harris | B60L 53/62 |
| 11,919,416 | B2 * | 3/2024 | Keister | H02J 7/0048 |
| 11,938,835 | B2 * | 3/2024 | Martin | B60L 53/60 |
| 11,985,914 | B2 * | 5/2024 | Aghai | A01C 14/00 |
| 12,083,913 | B2 * | 9/2024 | Keister | H02J 3/322 |
| 12,088,103 | B2 * | 9/2024 | Kim | H02J 5/00 |
| 12,088,213 | B2 * | 9/2024 | Tremblay | H02J 7/04 |
| 2002/0070705 | A1 * | 6/2002 | Buchanan | B60L 58/10 |
| | | | | 320/116 |
| 2004/0130292 | A1 * | 7/2004 | Buchanan | B60L 53/20 |
| | | | | 320/116 |
| 2009/0313033 | A1 | 12/2009 | Hafner et al. | |
| 2010/0106631 | A1 * | 4/2010 | Kurayama | B60L 53/14 |
| | | | | 320/109 |
| 2011/0015814 | A1 * | 1/2011 | Starr | G07F 15/003 |
| | | | | 320/101 |
| 2011/0106329 | A1 * | 5/2011 | Donnelly | B60L 53/665 |
| | | | | 320/109 |
| 2011/0140649 | A1 * | 6/2011 | Choi | H02J 7/35 |
| | | | | 320/112 |
| 2011/0148353 | A1 * | 6/2011 | King | B60L 58/20 |
| | | | | 320/109 |
| 2011/0202476 | A1 * | 8/2011 | Nagy | B60L 53/63 |
| | | | | 320/109 |
| 2011/0285345 | A1 * | 11/2011 | Kawai | H02J 7/0013 |
| | | | | 320/107 |
| 2011/0291616 | A1 | 12/2011 | Kim et al. | |
| 2012/0200256 | A1 * | 8/2012 | Tse | B60L 53/14 |
| | | | | 320/109 |
| 2012/0326668 | A1 * | 12/2012 | Ballatine | B60L 53/20 |
| | | | | 320/109 |
| 2013/0026979 | A1 * | 1/2013 | Endo | H02J 7/0068 |
| | | | | 320/107 |
| 2013/0057209 | A1 * | 3/2013 | Nergaard | B60L 1/003 |
| | | | | 320/109 |
| 2013/0057210 | A1 * | 3/2013 | Nergaard | B60L 53/11 |
| | | | | 320/109 |
| 2013/0069592 | A1 * | 3/2013 | Bouman | B60L 53/56 |
| | | | | 320/109 |
| 2013/0069599 | A1 * | 3/2013 | Kimura | B60L 53/62 |
| | | | | 320/162 |
| 2013/0179061 | A1 * | 7/2013 | Gadh | B60L 53/305 |
| | | | | 701/1 |
| 2013/0187602 | A1 * | 7/2013 | Bouman | B60L 53/20 |
| | | | | 320/109 |

(56) References Cited

U.S. PATENT DOCUMENTS

| | | | | |
|---|---|---|---|---|
| 2013/0314037 A1* | 11/2013 | Caffy | H02J 7/0071 | |
| | | | 320/109 | |
| 2014/0028254 A1 | 1/2014 | Shane et al. | | |
| 2014/0042967 A1* | 2/2014 | Herzog | B60L 53/31 | |
| | | | 320/109 | |
| 2014/0159650 A1* | 6/2014 | Beauregard | B60L 53/14 | |
| | | | 320/107 | |
| 2014/0207319 A1* | 7/2014 | King | B60L 7/14 | |
| | | | 701/22 | |
| 2014/0253034 A1* | 9/2014 | Kurimoto | B60L 50/16 | |
| | | | 320/109 | |
| 2014/0320083 A1* | 10/2014 | Masuda | B60L 58/12 | |
| | | | 320/109 | |
| 2014/0347017 A1* | 11/2014 | Sugano | B60L 53/122 | |
| | | | 320/137 | |
| 2014/0354229 A1* | 12/2014 | Zhao | B60L 53/68 | |
| | | | 320/109 | |
| 2015/0123613 A1* | 5/2015 | Koolen | B60L 53/67 | |
| | | | 320/109 | |
| 2015/0162757 A1* | 6/2015 | Endo | H02J 7/007194 | |
| | | | 320/107 | |
| 2015/0251547 A1* | 9/2015 | Nonomura | B60L 58/15 | |
| | | | 320/109 | |
| 2015/0326040 A1* | 11/2015 | Kawai | H02J 7/0013 | |
| | | | 320/162 | |
| 2015/0357855 A1* | 12/2015 | Endo | H02J 5/00 | |
| | | | 307/26 | |
| 2016/0121735 A1* | 5/2016 | Sugano | H02J 7/342 | |
| | | | 320/109 | |
| 2016/0297316 A1* | 10/2016 | Penilla | G06Q 30/0232 | |
| 2017/0001528 A1* | 1/2017 | King | B60L 9/22 | |
| 2017/0182900 A1* | 6/2017 | Ohkuma | B60L 53/50 | |
| 2017/0240063 A1* | 8/2017 | Herke | B60L 53/67 | |
| 2017/0346327 A1* | 11/2017 | Chen | H02J 7/0045 | |
| 2018/0001773 A1* | 1/2018 | King | B60L 50/30 | |
| 2018/0141447 A1* | 5/2018 | Koolen | B60L 53/31 | |
| 2018/0212438 A1* | 7/2018 | Bouman | B60L 53/63 | |
| 2018/0222340 A1 | 8/2018 | Zhao et al. | | |
| 2018/0254643 A1 | 9/2018 | Paluszek et al. | | |
| 2018/0290548 A1* | 10/2018 | Kalkmann | B60L 53/67 | |
| 2019/0070970 A1 | 3/2019 | Chan et al. | | |
| 2019/0160954 A1* | 5/2019 | Roggendorf | B60L 53/67 | |
| 2019/0176651 A1* | 6/2019 | King | H02J 7/0045 | |
| 2019/0193584 A1* | 6/2019 | Chen | H02J 7/34 | |
| 2019/0337405 A1* | 11/2019 | Hou | B60L 53/22 | |
| 2019/0351781 A1* | 11/2019 | Ben David | B60L 53/31 | |
| 2019/0372465 A1* | 12/2019 | Xu | H02M 3/33573 | |
| 2019/0389314 A1* | 12/2019 | Zhu | B60L 53/14 | |
| 2019/0389315 A1* | 12/2019 | Zhu | B60L 53/64 | |
| 2020/0044467 A1* | 2/2020 | Sosinov | H01M 10/44 | |
| 2020/0052507 A1* | 2/2020 | Apeldoorn | B60L 53/20 | |
| 2020/0086747 A1* | 3/2020 | Bhat | B60L 53/67 | |
| 2020/0086756 A1* | 3/2020 | Beaude | B60L 53/66 | |
| 2020/0114770 A1* | 4/2020 | King | H02J 7/0029 | |
| 2020/0137943 A1* | 5/2020 | Aghai | A01C 1/04 | |
| 2020/0139827 A1* | 5/2020 | Koolen | B60L 53/63 | |
| 2020/0140086 A1* | 5/2020 | Aghai | H02J 7/00716 | |
| 2020/0144849 A1* | 5/2020 | Thomson | A01C 15/16 | |
| 2020/0177026 A1* | 6/2020 | Sosinov | B60L 53/124 | |
| 2020/0376975 A1* | 12/2020 | Martin | H01M 8/04559 | |
| 2020/0403423 A1* | 12/2020 | Chan | G06Q 10/02 | |
| 2021/0094429 A1* | 4/2021 | Graßl | B60L 53/30 | |
| 2021/0101500 A1* | 4/2021 | Brombach | B60L 53/67 | |
| 2021/0129701 A1* | 5/2021 | Brombach | H02J 7/00 | |
| 2021/0213843 A1* | 7/2021 | Nishio | B60L 53/60 | |
| 2021/0237611 A1* | 8/2021 | Boehm | H02J 7/0013 | |
| 2021/0291689 A1* | 9/2021 | Ben David | H02J 7/02 | |
| 2021/0331598 A1* | 10/2021 | Ger | B60L 53/10 | |
| 2021/0370793 A1* | 12/2021 | Tombelli | B60L 53/66 | |
| 2021/0380008 A1* | 12/2021 | Martin | H01M 8/249 | |
| 2022/0072968 A1* | 3/2022 | Slepchenkov | B60L 53/22 | |
| 2022/0161677 A1* | 5/2022 | Pizzurro | H02J 3/381 | |
| 2022/0176840 A1* | 6/2022 | Harris | H02J 7/0029 | |
| 2022/0212551 A1* | 7/2022 | Bouman | H02J 7/00 | |
| 2022/0324336 A1* | 10/2022 | Tombelli | H02M 7/003 | |
| 2022/0348096 A1* | 11/2022 | Keister | H02J 7/06 | |
| 2022/0348100 A1* | 11/2022 | Keister | H02J 7/00712 | |
| 2022/0348101 A1* | 11/2022 | Keister | B60L 53/62 | |
| 2022/0355681 A1* | 11/2022 | King | H02J 7/0029 | |
| 2022/0355689 A1* | 11/2022 | Ben David | B60L 53/62 | |
| 2022/0376631 A1* | 11/2022 | Tremblay | H02M 7/06 | |
| 2023/0044052 A1* | 2/2023 | Slepchenkov | B60L 1/00 | |
| 2023/0049722 A1* | 2/2023 | King | B60L 58/20 | |
| 2023/0055592 A1* | 2/2023 | Kim | H02J 5/00 | |
| 2023/0059677 A1* | 2/2023 | Long | H02J 7/0013 | |
| 2023/0150390 A1* | 5/2023 | Moussavi | B60L 53/66 | |
| | | | 320/109 | |
| 2023/0202338 A1* | 6/2023 | Harris | B60L 3/04 | |
| | | | 320/109 | |
| 2023/0256853 A1* | 8/2023 | Keister | H02J 7/007194 | |
| | | | 320/109 | |
| 2023/0278452 A1* | 9/2023 | Kennedy | B60L 53/16 | |
| | | | 320/109 | |
| 2023/0322098 A1* | 10/2023 | Sun | B60L 53/11 | |
| | | | 320/108 | |
| 2023/0361561 A1* | 11/2023 | Rothmund | H02J 1/084 | |
| 2023/0411967 A1* | 12/2023 | Finn | B60L 53/63 | |
| 2024/0010091 A1* | 1/2024 | Wyand | B60L 53/16 | |
| 2024/0039414 A1* | 2/2024 | Kikuchi | H02M 7/4835 | |
| 2024/0109443 A1* | 4/2024 | Chan | B60L 53/63 | |
| 2024/0157821 A1* | 5/2024 | King | B60L 50/30 | |
| 2024/0190285 A1* | 6/2024 | Jarnut | H02J 7/0024 | |
| 2024/0317086 A1* | 9/2024 | Slepchenkov | B60L 53/22 | |

* cited by examiner

1: Charging System
2a-2b: Chargers
3: Electric Chain
4a-4h: Charging Terminals
5a-5h: Charging Locations
6: Switching System
7a-7b: Switching Devices
8: Control System 3: Electric Chain
4: Charging Terminal
7: Switching Device
9: Support
10: Box
11: Cable
11a-11b: Cable Ends
12: Human-Machine Interface 7: Switching Device
11: Cable
13a-13c: Connection Interfaces
14a-14c: Switches
15a-15c: Electrical Wirings 2a-2b: Chargers
3': Electric Chain
4a-4l: Charging Terminals
5a-5l: Charging Locations 2a-2c: Chargers
3': Electric Chain
4a-4l: Charging Terminals
5a-5l: Charging Locations 2a-2c: Chargers
3": Electric Chain
4a-4p: Charging Terminals
5a-5p: Charging Locations 2a-2b: Chargers
3': Electric Chain
4a-4p: Charging Terminals
5a-5p: Charging Locations 2a-2b: Chargers
3': Electric Chain
4a-4p: Charging Terminals
5a-5p: Charging Locations 2: Charger
3, 3', 3": Electric Chains
4a-4p: Charging Terminals
5a-5p: Charging Locations 2a-2b: Chargers
3": Electric Chain
4a-4p: Charging Terminals
5a-5p: Charging Locations 16 : Current Converter
17 : Power Supply Components
18 : Energy Meter
19 : Protection Equipment
20 : Communication Boards
2 : Charger

SYSTEM AND METHOD FOR ELECTRICALLY CHARGING MOTOR VEHICLES

CROSS-REFERENCE TO RELATED APPLICATION

This application is a national phase entry of International Application No.: PCT/EP2020/063115, filed on May 12, 2020 and titled "SYSTEM AND METHOD FOR ELECTRICALLY CHARGING MOTOR VEHICLES." which claims priority to and the benefit of French Patent Application No.: FR1904994, filed on May 14, 2019 and titled "Systeme et procede de charge en energie electrique de vehicules automobiles." The contents of the above-identified Applications are relied upon and incorporated herein by reference in their entirety.

FIELD OF THE INVENTION

The present invention relates to systems and methods for electrically charging electrical devices, particularly electrically chargeable motor vehicles.

Technological Background

More specifically, the invention relates to an automotive vehicle charging system.

For the past hundred years or so, motor vehicles have mainly been powered by energy derived from fossil sources. For decades, the method of distributing energy to motor vehicles has involved stations, at which the vehicle's fuel tank is filled within seconds. These stations allow a certain flexibility, by offering different types of fuels from fossil sources. In addition, as motor vehicles are intended to move, this results in a fine territorial network of stations.

In recent years, more and more motor vehicles need to be charged with a complementary or alternative energy source, for example electricity in the case of hybrid fossil fuel/electric vehicles, or fully electric vehicles. The range of a vehicle equipped with an on-board alternative energy tank is generally lower. In addition, the charging time of such a reservoir is longer than for fossil fuels. In addition, there are many new energy systems, so it becomes complicated to have all the services at the station. In addition, there are still few vehicles powered by alternative energies, which does not justify that each station is equipped with many alternative energy charging systems. This results in a paradigm shift in the automotive vehicle energy charging system. This paradigm shift has led to deporting the charging service from traditional stations to parking places. Today, energy charging is possible in many reserved locations arranged in the immediate vicinity of an energy source. US 2011/291, 616 describes an example of such a charging station which serves numerous reserved locations. The charging station is made modular by connecting in series or in parallel numerous charging modules themselves made up of charging "packs" connected in series and in parallel, which allows a fine dealing of the total power available to be distributed to vehicles with various electrical load characteristics.

However, this solution is not optimal because, if there are not enough of them, the reserved locations are all occupied, which prevents charging a motor vehicle. And, if there are enough of them, they are often unoccupied, which is problematic for the traditional vehicles. This solution is therefore not flexible enough to meet the need for user mobility and the rapid development in the number of vehicles using alternative energy sources.

US 2018/254,643 describes a system timing the electric vehicle charging. However, this system remains greedy in terms of infrastructure.

The invention thus aims to improve the availability of electric energy charging systems for motor vehicles.

SUMMARY OF THE INVENTION

Thus, the invention relates to an electrical energy charging system for electrical devices comprising:
- at least a first and a second charger, each charger being adapted to provide instantaneous electrical energy for charging an electrical device,
- an electric chain connecting the first and second chargers,
- at least a first, a second and a third charging terminals, each charging terminal being electrically connectable to each of the first and second chargers via the electric chain,
- a switching system adapted to alternately connect or not each charging terminal to the first or second charger, each charger being able to be instantaneously connected, at most, to only one single charging terminal,
- a control system comprising:
  - a computerized receiving module suitable for receiving charging information from electrical devices comprising at least one identifier of a charging terminal to which the electrical device is connected,
  - a processor suitable for determining, repeatedly, from at least one rule stored and accessible to the processor, a mapping of connections between the charging terminals and the chargers, as a function of at least the received charging information and at least one other information chosen from:
    - instantaneous time information provided by a clock;
    - information on the arrival time of an electrical device at a charging terminal;
    - information on the estimated departure time of an electrical device from the charging terminal;
    - information on the estimated duration of presence of an electrical device at a charging terminal;
    - information on the initial charge level of an electrical device;
    - information on the desired final charge level for an electrical device;
  - the control system being adapted to repeatedly control the switching system to electrically connect, according to the determined mapping of connections, one of the charging terminals to the first charger via the electric chain and another of the charging terminals to the second charger via the electric chain.

Thanks to these arrangements, many electric vehicles can be charged over a given period of time by means of a smaller number of chargers. Parking spaces do not need to be reserved for electric vehicles only.

According to different aspects, it is possible to provide for one and/or the other of the provisions below.

According to one embodiment, the processor is suitable for determining the mapping of connections also from information on the instantaneous charge level of an electrical device.

According to one embodiment, the switching system comprises a switching device associated respectively with each charging terminal.

According to one embodiment, the switching system comprises a plurality of switching devices, each switching device being able alternately to:

electrically connect the location associated with the switching device with the electric chain on the first side, electrically connect the location associated with the switching device with the electrical chain on the second side, let the electrical energy pass without connecting the location associated with the switching device, open the electric chain.

According to one embodiment, the switching system comprises a switching device associated with at least one charger.

According to one embodiment, the switching device associated with a charging terminal and the switching device associated with a charger have the same electrical diagram.

According to one embodiment, at least one of the chargers is movable, the control system being adapted to repeatedly control the switching system to electrically connect one of the charging terminals to the first charger via the electric chain and another of the charging terminals to the second charger via the electric chain depending on the location of the chargers.

According to one embodiment, the mobile charger is connected to the electric chain via a charging terminal.

According to one embodiment, the mobile charger is an electric vehicle.

According to another aspect, the invention relates to a method of charging electrical energy to electrical devices in which, having:

at least a first and a second charger, each charger being adapted to provide instantaneous electrical energy for charging an electrical device, an electric chain connecting the first and second chargers, at least a first, a second and a third charging terminals, each charging terminal being electrically connectable to each of the first and second chargers via the electric chain, a switching system adapted to alternately connect or not each charging terminal to the first or second charger, each charger being able to be instantaneously connected, at most, to only one single charging terminal, a computerized receiving module of a control system receives charging information from electrical devices comprising at least one identifier of a charging terminal to which the electrical device is connected, A processor of the control system repeatedly determines, from at least one rule stored and accessible to the processor, a mapping of connections between the charging terminals and the chargers, as a function of at least the received charging information, and at least one other item of information chosen from:

instantaneous time information provided by a clock;

information on the arrival time of an electrical device at a charging terminal;

information on the estimated departure time of an electrical device from the charging terminal;

information on the estimated duration of presence of an electrical device at a charging terminal;

information on the initial charge level of an electrical device;

information on the desired final charge level for an electrical device, the control system repeatedly controls the switching system to electrically connect, according to the determined mapping of connections, one of the charging terminals to the first charger via the electric chain and another of the charging terminals to the second charger via the electric chain.

According to another aspect, the invention relates to a computer program comprising instructions which, when the program is executed by a computer, lead the latter to implement this method.

BRIEF DESCRIPTION OF THE DRAWINGS

Embodiments of the invention will be described below with reference to the drawings, described briefly below.

Figure 1:
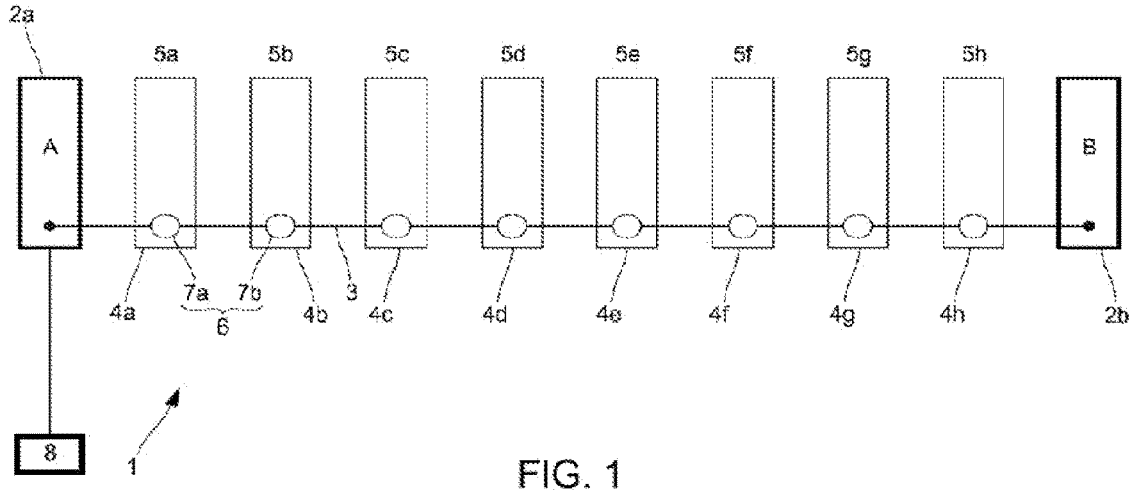
FIG. 1 schematically represents a charging system according to one embodiment.

In the drawings, identical references designate identical or similar objects.

DETAILED DESCRIPTION

[FIG. 1] schematically shows a charging system 1 according to one embodiment. The charging system 1 comprises a first charger 2a and a second charger 2b. Here, chargers can be designated either by the general reference "2", or individually by the reference "2" followed by a letter. Each charger 2 is connected to an energy source, and is capable, instantaneously, of supplying electrical energy to an electric vehicle, according to a particular charging mode. In the present example, to simplify matters, each electric charger 2 implements a single particular charging mode, namely, for example, a so-called "fast" charge according to the standards published and in force on the priority date of the present patent application. This is for example a direct current charge, with a power equal to or greater than 10 kW, or even 50 kW, or even 100 kW. The energy source from which the energy supplied by the charger 2 is derived is for example one and/or the other of the electrical network, a renewable energy source, an energy storage (battery, fuel cell with hydrogen storage, . . . ).

In this example, the two chargers 2a, 2b, are distant from each other.

The charging system 1 comprises an electric chain 3 extending from one of the two chargers to the other. The electric chain 3 is able to transport the electric energy coming from a charger.

The charging system 1 further comprises a plurality of charging terminals. Here, the charging terminals can be designated either by the general reference "4" or individually by the reference "4" followed by a letter. The number of charging terminals 4 is strictly greater than the number of chargers 2. The charging terminals 4 are interposed between the two chargers 2. In addition, in the example shown, the charging terminals 4 are interposed between each other. More precisely, a charging terminal 4a, the one closest to the charger 2a, is interposed between the charger 2a and a charging terminal 4b. The charging terminal 4b is interposed between the charging terminal 4a and a charging terminal 4c. So on, up to the charging terminal 4h interposed between the charging terminal 4g and the charger 2b.

The charging terminals 4 are arranged along the electric chain 3. Thus, by "interposed between" two devices, it is meant that the charging terminal is between the two other devices along the electric chain 3.

Each charging terminal 4 serves an electric vehicle charging location. Here, the charging locations can be designated either by the general reference "5" or individually by the reference "5" followed by a letter. The letter designating the charging location is the same as the letter designating the charging terminal associated with the charging location.

Each charging location 5 is suitable for receiving an electric vehicle capable of being charged with electrical energy by the charging system 1 via the associated charging terminal 4.

The charging system includes a switching system 6. The switching system 6 comprises a set of switching devices. Switching devices can be designated either by the general reference "7" or individually by the reference "7" followed by a letter. A switching device 7 is associated with each charging terminal 4. The letter designating the switching device is the same as the letter designating the charging terminal associated with the switching device.

Each switching device 7 is electrically connected to the charging terminal 4 with which it is associated. The switching devices 7 are also interposed with one another along the electrical chain.

In addition, switching devices 7 are connected one by one by an electric line included in the electric chain 3. More precisely, in the example presented, a switching device 7a, associated and connected to the charging terminal 4a, is also connected to the charger 2a and to the adjacent switching device 7b. The switching device 7b, associated and connected to the charging terminal 4b, is connected to the previous switching device 7a, and also to the next adjacent switching device 7c. In this example, this configuration is reproduced up to the switching device 7h, associated and connected to the charging terminal 4g, which is connected to the switching device 7g and to the charger 2b.

A switching device 7 is adapted to be able to be switched between several configurations. Depending on the configurations (for the illustrative example of charging terminal 4a):

The switching device 7a allows an electrical connection of the charging terminal 4a to which it is associated with the charger 2a, the switching device 7a allows an electrical connection of the charging terminal 4a to which it is associated with the charger 2b, the switching device 7a does not connect the charging terminal 4a to which it is associated with any charger and lets the current flow along the electric chain 3, The switching device 7a does not connect the charging terminal 4a to which it is associated with any charger and does not allow current to pass.

In addition, the switching system 6 is configured so that, if a charging terminal 4c is connected to a charger 2a, the charging terminals interposed between the charging terminal 4c and the charger 2a are all connected to no charger and allow the current to flow. References "4c" and "2a" are illustrative only.

It follows that, instantaneously, a charger 2 is connected at most to a single charging terminal 4. By "instantaneously", we mean here "at a given time". A charging terminal 4 is connected to at most a single charger 2. The switching system 6 thus allows a one-to-one association between the chargers 2 and the charging terminals 4. At a given time, for each charging terminal 4, either it is not connected to any charger, or it is connected to a single charger 2. At a given time, for each charger 2, either it is not connected to any charging terminal 4, or it is connected to a single charging terminal 4.

The charging system 1 also includes a control system 8. The control system 8 is in communication, wired or wireless, with each of the switching devices 7. The control system 8 is configured to repeatedly control the switching devices 7 between their four configurations.

The control system 8 is clocked by a clock, for example according to a predetermined rate. The rate can for example be configured, and modified over time. According to an exemplary embodiment, the rate is that of an operation to verify a need for switching every 5 minutes. For example, provision can be made for an operation to verify the need for switching at a frequency between once every ten seconds and once every twenty minutes.

This determination is not necessarily periodic. For example, provision can be made that a new operation to verify the need for switching is also implemented at the connection of a new vehicle or at the disconnection of a new vehicle.

Upon initiation of an operation to verify the need for switching, the control system 8 verifies the need for switching. Depending on the result of this operation, either the control system 8 does not command any switching, or the control system 8 commands one or more switchings of the switching devices 7. Since each switching device 7 has four configurations, we call "switching" the switching of a switching device 7 from its current configuration to another configuration. As will be seen below, this switching command may require switching several individual switches.

Figure 2:
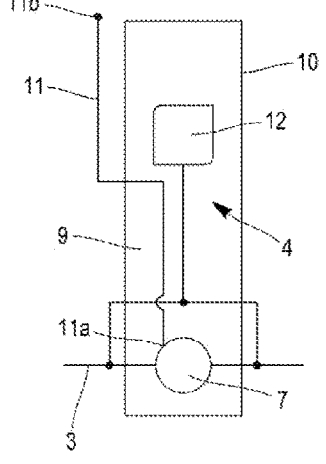
FIG. 2 schematically represents a charging terminal part of the charging system of FIG. 1.

[FIG. 2] schematically represents a charging terminal 4. The charging terminal 4 can include a support 9 delimited by a housing 10, and fixed to the ground. The support 9 receives a charging cable 11 comprising a first end 11a and an opposite second end 11b. The first end 11a is electrically connected to the switching device 7. The second end 11b comprises a charging interface adapted to be electrically connected to a complementary charging interface of the electric vehicle.

Although, in the diagram, the switching device 7 is shown as integrated with the charging terminal 4, this is not necessarily the case. The switching device 7 can be adjacent to the charging terminal, or connected between two adjacent charging terminals.

As will be understood from the following description, the charging terminal 4 can include various electronic components. These can be electrically supplied by an electrical connection from the charging terminal 4 to the mains. This electrical connection can, if necessary, be made through the electric chain 3. In particular, as shown in FIG. 2, the electrical chain 3 comprises, upstream of the charging terminal 4, an electrical harness which comprises one or more wires which are electrically connected to the switching device 7, and one or more wires which are electrically connected to the electronic components of the charging terminal 4 (materialized, in the example, by the man-machine interface 12 presented below) for the electrical supply of these components.

The charging terminal 4 can also include a man-machine interface 12 adapted to allow communication between the motor vehicle associated with the charging terminal 4 and the charging system 1. Several variants are possible for the man-machine interface 12. According to one example, provision can be made for the man-machine interface 12 to include a means for sending information to the user and/or means for receiving information from the user. According to the embodiments, one can for example provide a screen and keyboard system, or a screen provided with a touch screen, and/or a communication system with a portable computing device of the user, and/or with a computing device of the vehicle, making it possible to exchange information via the man-machine interface of one and/or the other of these computer devices.

The charging system 1 includes a suitable communication system to allow the transfer of information between the different components that need it. The man-machine interface 12 described above is part of this communication system. The communication system can also include a communication system between the charging terminal 4 and the control system 8. The control system 8 therefore includes an information reception module. For example, a wired communication is provided between the charging terminal 4 and the control system 8, to transmit information between the charging terminal 4 and the control system 8. It is in particular possible to use the electric chain 3 for the transmission of this information. This therefore includes wires which allow the transfer of information between the charging terminal 4 and the control system 8, for example via the charger 2a. The information in question includes, for example, that entered, or part of that entered via the man-machine interface 12 of the charging terminal 4.

The information in question can also include information coming from the vehicle (for example from the vehicle battery), and transmitted by the vehicle to the charging terminal 4. The information in question can also include an identifier of the charging terminal 4 to be associated with the aforementioned information.

Alternatively, the communication system may include a communication system between the control system 8 and the user directly. For example, a wireless communication system can be provided between the control system 8 and the user's portable computing device, and/or with a computer device of the vehicle.

According to one example, the information communicated to the control system 8 may include one and/or the other of the following information, associated with each other:
- an identifier of an electric vehicle;
- a user ID;
- an identifier of a charging terminal;
- information on the arrival time of an electric vehicle at a charging terminal;
- information on the estimated departure time of an electric vehicle from the charging terminal;
- information on the estimated duration of presence of an electric vehicle at a charging terminal;
- information on the initial charge level of an electric vehicle;
- information on the desired final charge level for an electric vehicle;
- instantaneous charge level information for an electric vehicle.

In addition, the control system 8 has instantaneous time information provided by a clock.

The information in question is either provided by the user, the vehicle, the charging terminal, or, in some cases, estimated by the control system 8.

The control system 8 comprises a processor suitable for repeatedly determining a mapping of connections between the charging terminals and the chargers, as a function of the information available. The mapping of connections is determined by the processor in order to optimally respond to a load request by electric vehicles. The optimal way is determined by one or more rules stored and accessible to the processor. These rules can be configured, if necessary.

To determine the mapping of connections, the processor can for example take into account the current mapping of connection.

Following the establishment of the mapping of connection, the control system 8 can command the switching of one or more switching devices 7, to comply with the determined mapping of connection.

In some cases, the determined mapping of connection is unchanged from the previous mapping of connection and, in this case, the control system does not command any switching.

Figure 3:
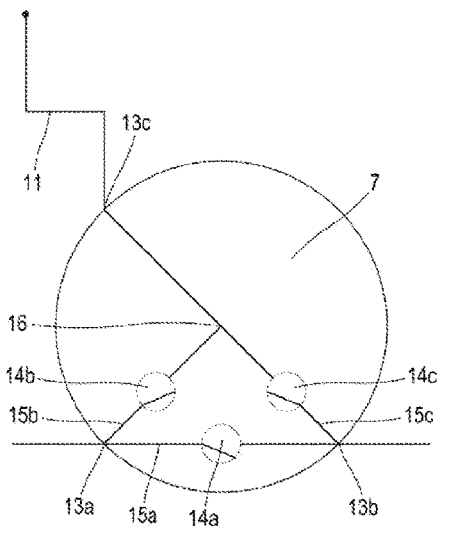
FIG. 3 diagrammatically represents a switching device part of the charging system of FIG. 1.

[FIG. 3] schematically shows a switching device 7 according to one embodiment. The switching device 7 comprises three connection interfaces: A connection interface 13a with the first charger 2a, a connection interface 13b with the second charger 2b, a connection interface 13c with the cable 11.

The switching device 7 includes electrical wiring for making various electrical connections. Electrical wiring can be designated either by the general reference "15", or individually by the reference "15" followed by a letter. The switching device 7 comprises various individual switches. Individual switches can be designated either by the general reference "14" or individually by the reference "14" followed by a letter. Different variants of the presented arrangement are possible to obtain the same switching functions.

An electrical wiring 15a connects the connection interfaces 13a and 13b. A switch 14a equips this electrical wiring. An electrical wiring 15b connects the connection interface 13a to the connection interface 13c. A switch 14b equips this electrical wiring. An electrical wiring 15c connects the connection interface 13b to the connection interface 13c. A switch 14c equips this electrical wiring. A security system is configured so that only one of the switches 14a, 14b, 14c can be closed at a time.

Each individual switch 14 can alternately take the closed state (current flows) or the open state (current does not flow).

In the diagram in FIG. 3, all switches are in the open state. Therefore, in this configuration, the cable 11 is not supplied.

The following configurations of the switching device 7 are possible ("F" represents the "closed" state, and "O" represents the "open" state):

TABLES 1

| # | Switch 14a | Switch 14b | Switch 14c | Configuration |
|---|---|---|---|---|
| AA | O | O | O | Open |
| CC | O | F | O | Vehicle charge by charger 2a (from the first side) |
| EE | O | O | F | Vehicle charge by charger 2b (from the second side) |
| FF | F | O | O | Transmission of the energy beyond the switch |

Charging configurations by charger 2a require that interface 13a be electrically connected to it. Thus, the switching devices 7 intermediate between that described and the charger 2a must be in the "FF" configuration.

Charging configurations by charger 2b require that interface 13b be electrically connected to it. Thus, the switching devices 7 intermediate between that described and the charger 2b must be in the "FF" configuration.

The above table therefore schematically represents the charging of two vehicles at the charging locations 5c and 5g by the chargers 2a and 2b.

TABLES 2

| 2a | 7a | 7b | 7c | 7d | 7e | 7f | 7g | 7h | 2b |
|---|---|---|---|---|---|---|---|---|---|
|  | FF | FF | CC | N/A | N/A | N/A | EE | FF |  |

The "CC" configuration of the switching device 7c and the "EE" configuration of the switching device 7g electrically isolate the circuit elements arranged between them even if the configuration of these latter elements is not the open configuration.

It will be noted that, if, as described below, switching devices also equip the chargers, the switching device of the charger 2a, in this scenario, is in the "EE" configuration, and the switching device of the charger 2b, in this scenario, is in the "CC" configuration.

The implementation of one embodiment of the invention will be described below.

It can be assumed that initially no electric vehicle is connected to the charging system 1. Fossil fuel vehicles can be parked in various locations but are not plugged in. If no vehicle is plugged in, the control system 8 can be deactivated. All of the switching devices 7 can be in their open "AA" configuration.

A first electric vehicle VE1 is parked in a location. To settle ideas, the electric vehicle VE1 parks in location 5c. The user of the electric vehicle VE1 electrically connects the vehicle by means of the cable 11 of the terminal 4c.

The control system 8 receives the following information: the identifier of the charging terminal 4c from the latter, information on the arrival time of the electric vehicle at the charging terminal 4c from a clock, information on the initial charge level of the electric vehicle from the processor of the electric vehicle. For example, this information is transmitted by a wireless communication system between each charging terminal and the control system 8. Connecting the charging terminal to the electric vehicle triggers the sending of information from the charging terminal 4c to the control system 8. The clock is for example centralized at the level of the control system 8.

The control system 8 can also receive one and/or the other of the following information from the user: information on the estimated time of departure of the vehicle, or information on the estimated duration of presence of the vehicle at the charging terminal, and information on the desired final charge level for the electric vehicle associated with the charging terminal.

As discussed above, this information is provided by the user via the human-machine interface of the charging terminal, a user's portable processor, and/or a vehicle processor. If necessary, failing to receive this information, the control system can use pre-recorded parameters. According to one example, the estimated duration of presence is set at a predetermined value, for example two hours (configured according to the operation of the system, for example between one hour and ten hours). According to one example, the desired final charge level information for the electric vehicle can for example be set to "full of energy" or to "without instruction", in which case the control system 8 will charge the vehicle as best as possible in view of the other constraints.

At a certain point, the control system 8 establishes the mapping of connection.

Since only one vehicle is to be charged, the control system 8 establishes a mapping of connection by which the vehicle at location 5c is charged by an available charger, for example the charger 2a.

The control system 8 controls the switching system 6 to electrically connect the charging terminal 4c to the first charger 2a via the electric chain 3.

TABLES 3

| 2a | 7a | 7b | 7c | 7d | 7e | 7f | 7g | 7h | 2b |
|---|---|---|---|---|---|---|---|---|---|
|  | FF | FF | CC | N/A | N/A | N/A | N/A | N/A |  |

Note that as an alternative, the vehicle could be charged by charger 2b. The mapping of connection would in such case be different.

In any case, the vehicle is charged by a single charger.

Regularly, the control system 8 establishes a mapping of connection. As long as the electric vehicle is charging, a priori, it is not necessary to change the mapping of connection.

If the electric vehicle reaches the charging setpoint, or if the charging service is interrupted, the control system 8 is interrupted.

In some cases, the vehicle VE1 is being charged when a second electric vehicle VE2 requests access to the service. The request for access to the service for vehicle VE2 is made in the same way as for vehicle VE1, described above.

To settle ideas, in a first exemplary embodiment, the second electric vehicle VE2 is parked in location 5g.

At a certain point, the control system 8 establishes the mapping of connection.

Given that only two vehicles are to be loaded, the control system 8 establishes a mapping of connection by which each charger charges the vehicle closest to it. Each vehicle is charged by a single charger.

The mapping is as follows:

TABLES 4

| 2a | 7a | 7b | 7c | 7d | 7e | 7f | 7g | 7h | 2b |
|---|---|---|---|---|---|---|---|---|---|
|  | FF | FF | CC | N/A | N/A | N/A | EE | FF |  |

The control system 8 regularly establishes a mapping of connection. As long as electric vehicles charge, a priori, the mapping connection map will not change.

If one of the electric vehicles reaches its charging setpoint, we return to a configuration where only one electric vehicle is to be charged, namely the one that has not reached its setpoint.

In this case, we find ourselves in the configuration described above with a single vehicle to load.

In another case, the incoming vehicle VE2 will park in a location intermediate between the vehicle charging terminal VE1 and the charger supplying it, for example at location 5b. In this case, the control system 8 will disconnect the electric vehicle VE1 from the first charger and connect it to the second charger 2b, and connect the incoming vehicle VE2 to the first charger 2a according to the following mapping:

TABLES 5

| 2a | 7a | 7b | 7c | 7d | 7e | 7f | 7g | 7h | 2b |
|---|---|---|---|---|---|---|---|---|---|
|  | FF | CC | EE | FF | FF | FF | FF | FF |  |

In some cases, a third electric vehicle VE3 will request access to the charging service.

For example, we place ourselves in a starting configuration as shown in the table above, where vehicles to be loaded are at locations 5b and 5c.

The charging system 1 can only charge two vehicles simultaneously.

At a certain point, the control system 8 establishes the mapping of connection.

This mapping of connection is established so as to optimize the provision of the service to all applicants.

This goal can be achieved by determining the instantaneous least bad configuration.

The criteria for determining the instantaneous least bad configuration are set in the control system 8.

The control system 8 therefore determines which two vehicles are to be electrically charged during the next time interval. This determination can take into account information on the instantaneous level of charge of the electric vehicles requesting the service. This information can be communicated either by the motor vehicle or estimated by the control system 8 from the initial charge level and from the level of charge transmitted to this vehicle.

This determination can be made, for example, by searching for a minimum for a determined or configured cost function in the control system 8. The cost function aims to optimize the response to the constraints of all vehicles.

For example, if the estimated departure time of the vehicle VE1 is close, and that this one is far from being loaded up to the desired level of load at departure, that the level of load desired by the vehicle VE3 is "free", and that the estimated departure times of vehicles VE2 and VE3 are more distant than that of vehicle VE1, an optimal mapping of connection can be, for the next time interval, to charge vehicles VE1 and VE2, and not to charge the vehicle VE3.

Continuing the previous example, and assuming the vehicle VE3 is parked at location 5g, the mapping of connection can be determined as follows:

TABLES 6

| 2a | 7a | 7b | 7c | 7d | 7e | 7f | 7g | 7h | 2b |
|----|----|----|----|----|----|----|----|----|----|
|    | FF | CC | N/A | N/A | N/A | N/A | EE | FF |    |

It is possible to keep the switching devices 7c-7f in their previous configuration. These are anyway electrically isolated in view of the configuration of the switching devices 7b and 7g.

As a variant, in this example, the control system can determine that the vehicles to be loaded are vehicles VE2 and VE1, respectively at locations 5b and 5c, and in this case, the arrival of vehicle VE3 does not change the mapping of connection map presented above in the case where there are only two vehicles.

Alternatively, in this example, the control system can determine that the vehicles to be loaded are vehicles VE1 and VE3, respectively at locations 5c and 5g, and in this case, the mapping of connection map:

TABLES 7

| 2a | 7a | 7b | 7c | 7d | 7e | 7f | 7g | 7h | 2b |
|----|----|----|----|----|----|----|----|----|----|
|    | FF | FF | CC | N/A | N/A | N/A | EE | FF |    |

In all cases, for a number of vehicles to be loaded equal to the number of chargers, these vehicles to be loaded are each loaded by a single respective charger, and the additional vehicles to be loaded are on standby.

In the event that one of the vehicles were to interrupt service, the next determination step would be with the remaining vehicles. We thus return to the two-vehicle configuration presented above.

In the case of three vehicles being loaded, regularly, the control system 8 redefines the loading map as a function of the information available at that moment. Indeed, the charging speed may decrease as the vehicle's battery charge percentage reaches high levels. It would then be more judicious to restore the priority of the load to a vehicle with a low level of load. For example, if two vehicles being loaded are close to reaching the required charge level, it becomes more and more of a disadvantage not to charge the third vehicle at all.

At any time, a fourth vehicle can request access to the service.

The operation, described above, for three vehicles, can be extended to four vehicles.

In the example shown, the number of locations between the two chargers is eight. In this example, up to eight vehicles can simultaneously access the service provided by two chargers.

The total number of locations served by the two chargers depends on the configuration of the system installation.

The invention is of particular interest as soon as the number of locations is strictly greater than the number of chargers.

In theory, there is no limit to the maximum number of locations served by the two chargers. However, for practical reasons, and to maximize the chances of being able to provide an efficient service, the number of locations served by two chargers can typically be less than 50, or even 20, or even 10.

A large number of locations is possible in parking areas where the density of electric vehicles is low, and where the charging time intervals of electric vehicles vary greatly from vehicle to vehicle. Thus, fossil-fueled vehicles can park on the locations, which are not reserved for electric vehicles.

For the management of electric vehicle fleets, where the density of electric vehicles is high, and where all the electric vehicles are to be charged at the same time, we prefer a reduced number of locations per charger.

Figure 4:
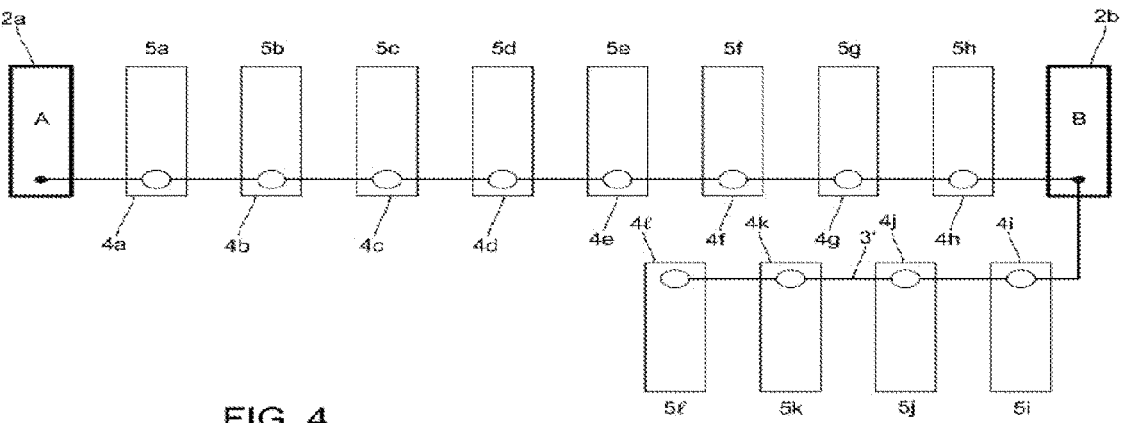
FIGS. 4 to 10 are diagrams similar to FIG. 1, each illustrating another embodiment.

[FIG. 4] schematically shows a second embodiment of the invention.

This embodiment differs from the embodiment presented above in that charging locations 5 are arranged on either side of the charger 2b.

In particular, the charging locations 5i-51 are associated with charging terminals 4i-41 which are connected to the charger 2b via an electric chain 3'. Thus, in this configuration, the charger 2b can alternately transmit an electric charge energy to the charging terminals 4a-4h via the electric chain 3, or to the charging terminals 4i-41 via the electric chain 3'. The charger 2a cannot supply the charging terminals 4i-41.

Figure 5:
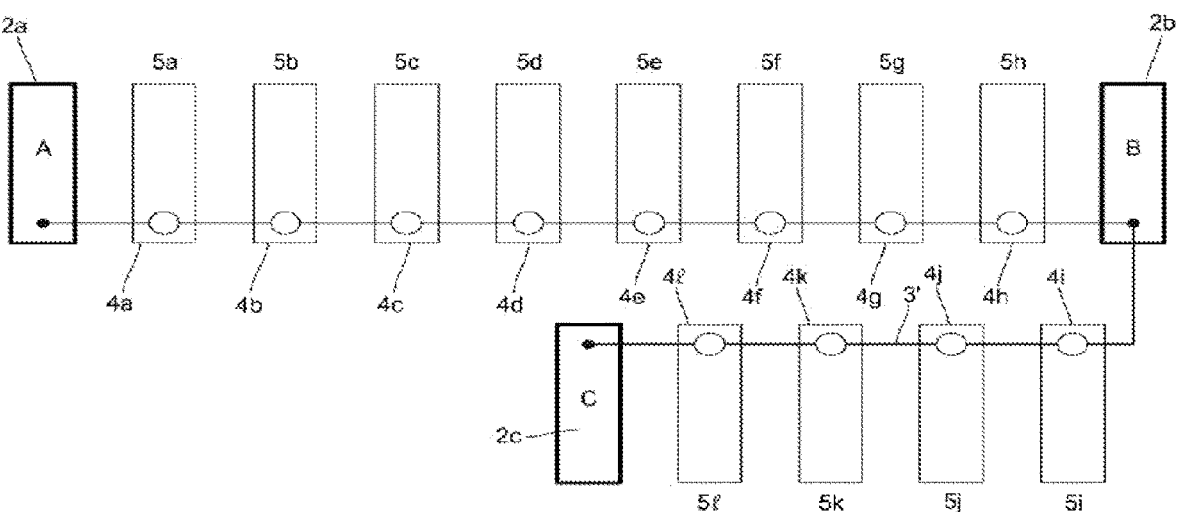

[FIG. 5] schematically shows a third embodiment of the invention.

This embodiment differs from the embodiment presented above, in that a third charger 2c is disposed at the end of the chain 3'. More precisely, the charging terminals 4a-4h are arranged between the chargers 2a and 2b, and supplied by one or the other via the electric chain 3, and the charging terminals 4i-41 are arranged between the chargers 2b and 2c, and supplied by one or the other via the electric chain 3'.

It should be noted that, in this embodiment, the charger 2b is able to supply each of the charging terminals 4a-41.

Figure 6:
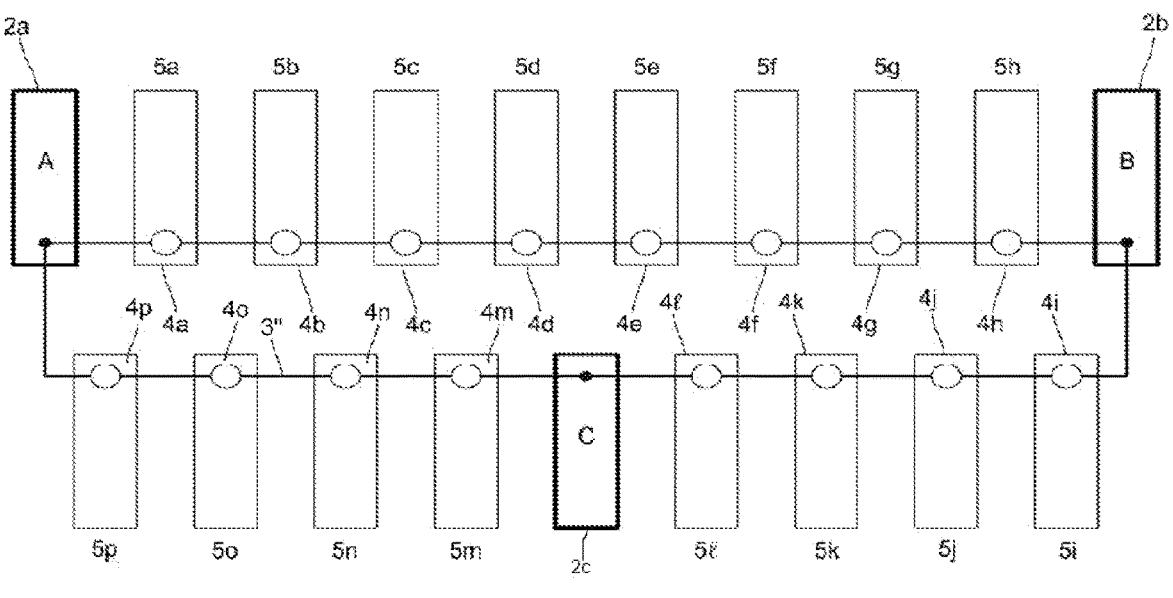

[FIG. 6] schematically shows a fourth embodiment of the invention.

This embodiment differs from the embodiment presented above in that the charging locations 5 are arranged on either side of the charger 2c. In particular, the charging locations 5m-5p are associated with charging terminals 4m-4p which are connected to the charger 2c via an electric chain 3". Thus, in this configuration, the charger 2c can alternately transmit an electric charge energy to the charging terminals 4i-41 via the electric chain 3', or to the charging terminals 4m-4p via the electric chain 3". In addition, the electric chain 3" is connected to the charger 2a. Thus, the charger 2a can alternately transmit electric charging energy to the charging terminals 4a-4h via the electric chain 3, or to the charging terminals 4m-4p via the electric chain 3". This embodiment differs from the previous one in that the circuit produced by the electric chains 3, 3', 3" is closed. More precisely, as in the first embodiment, each charging terminal can be supplied as desired by two chargers.

Figure 7:
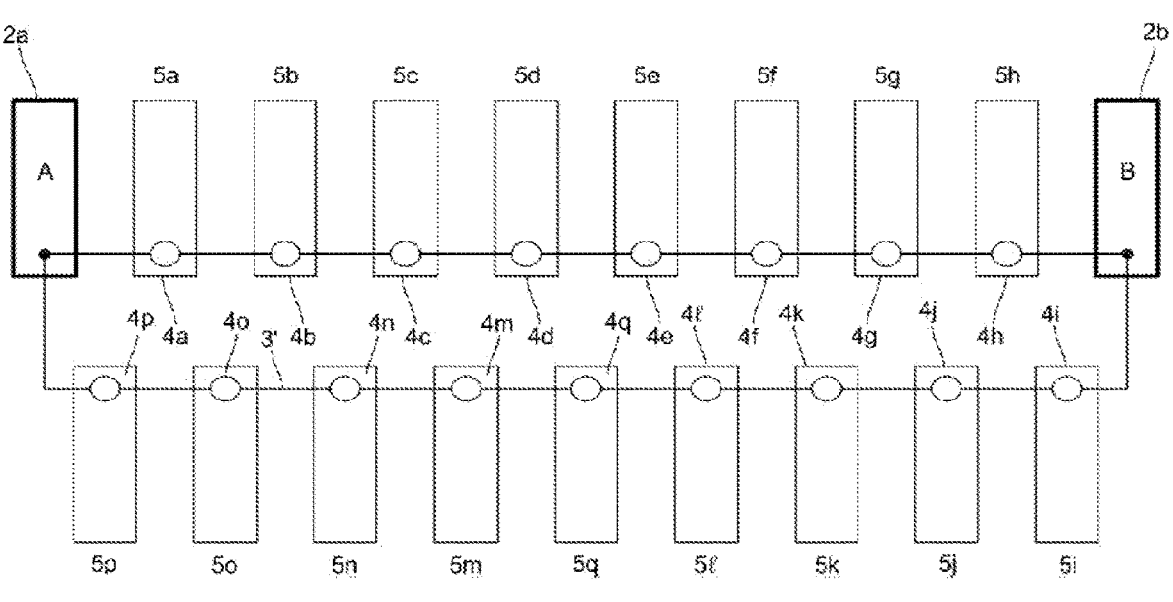

[FIG. 7] schematically shows a fifth embodiment of the invention.

This embodiment comprises two chargers 2a, 2b, linked together on the one hand by an electric chain 3, and on the other hand by an electric chain 3', each serving various charging locations 5.

Figure 8:
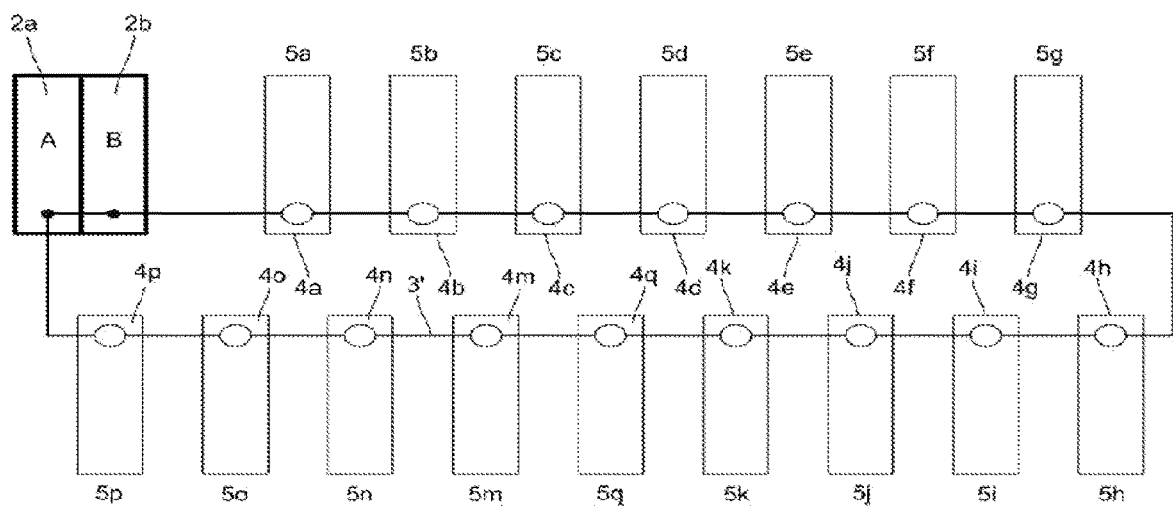

[FIG. 8] schematically shows a sixth embodiment of the invention.

This embodiment is in fact similar to that of FIG. 7, except that the two chargers 2a, 2b are juxtaposed. In practice, the two chargers could share the same box.

Other configurations can be considered based on the configurations described above. In particular, provision can be made to equip a parking lot with numerous chargers connected in pairs by electric chains, in a wide variety of configurations.

Figure 9:
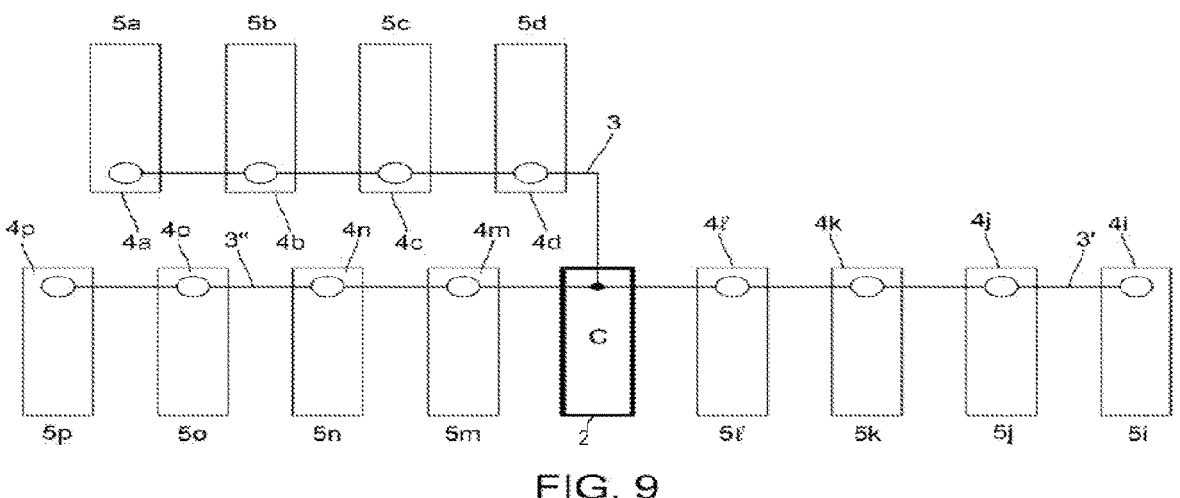

[FIG. 9] schematically shows a seventh embodiment of the invention. This embodiment differs from the above embodiment in that the charger 2 is connected to three electric chains 3, 3', 3".

Alternatively, a charger can be connected to more than three electric chains.

According to one embodiment, provision could be made for at least one of the chargers 2a, 2b, 2c to be mobile. Reference is made, for example, to the mobile chargers described in U.S. Pat. No. 9,592,742 or in international patent application WO 2018/140,886. Such mobile chargers are electric vehicles, which carry electric chargers. Such mobile chargers can be used to charge remote electric vehicles parked in locations not equipped by the invention. Also, if the constraints imposed by the electric vehicles to be charged allow it, and if charging locations 5 are available for a mobile charger to park there, the control system can determine a mapping of connection that supplies the mobile charger. The mobile charger can then be electrically connected to the electric chain via a charging terminal 4.

Figure 10:
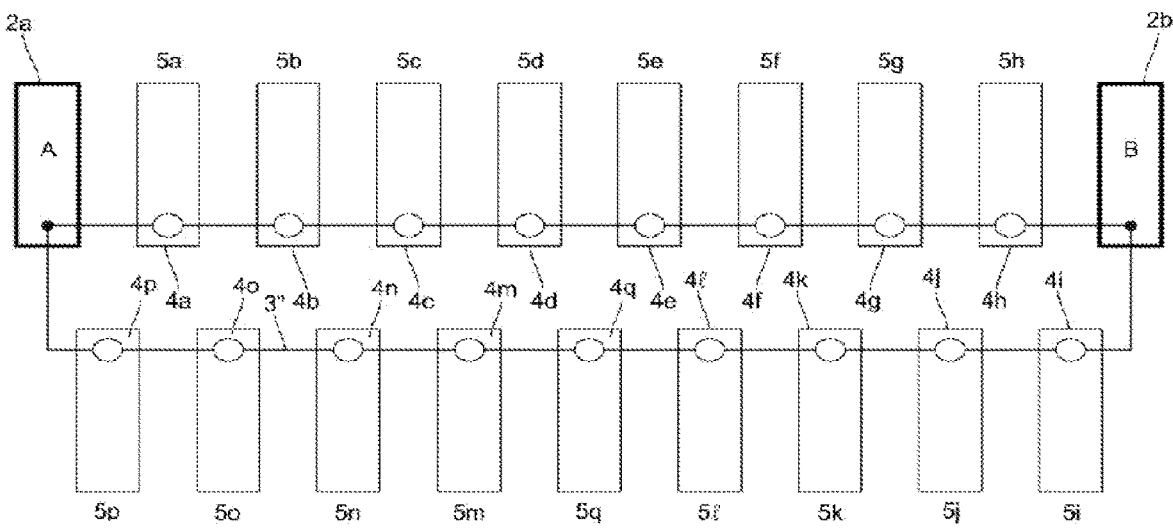

[FIG. 10] shows for example a first configuration, in which the control system 8 controls two chargers 2a, 2b.

If the control system 8 determines that it will not be able to provide the requested service, it can order a mobile charger 2c to come in addition to connect to the system. In a second configuration, the system thus conforms to FIG. 6, where the mobile charger 2c is interposed between the chargers 2a and 2b.

For example, location 5q includes a switching device 7 as described above. In the configuration of FIG. 10, the switching device 7 is either in its open configuration "AA", or in its configuration "FF" allowing the electrical energy coming from the charger 2a to supply vehicles downstream from location 5q, or to the electrical energy coming from the charger 2b to supply vehicles downstream from the location 5q.

The mobile charger 2c can be connected to the interface 13c of the switching device 7 of the charging terminal 4q. In this case, one information available to the control system 8 is that the location 5q contains an energy source.

It will be noted that, in the example presented above, it is the control system 8 which controls the connection to the system of a mobile charger. However, alternatively, the mobile chargers can be moved independently of a command by the control system 8. In this case, simply, the control system 8 receives the information of the availability of an additional charger at a given location. The control system 8 then establishes the mapping of connections for the new number and the new locations of available chargers.

Each charger can be connected to the electric chain by a switching device 7, as long as it is only connected to one or two electric chains. The switching devices associated with the chargers and the charging terminals then have the same electrical diagram. If the charger is connected to more than two electric chains, a dedicated switching device must be provided.

It will be noted that, in addition, one of the electric vehicles parked to be charged can be used as a charger.

Figure 11:
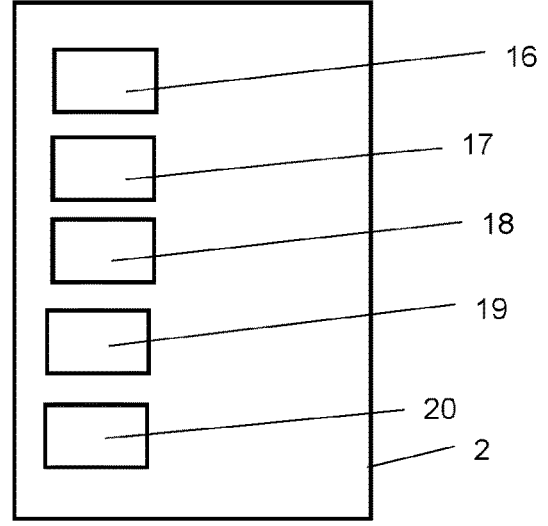
FIG. 11 schematically represents a charger.

As shown in FIG. 11, each of the chargers 2 is equipped with power electronics equipment: current converter 16, power supply components 17, energy meter 18, protection equipment 19 (switch, circuit breaker, diode, fuse, etc.), and communication boards 20 with the vehicle to be charged or with the charging terminal.

The above description has been made for a given load standard, for example the "Chademo" standard, a shorthand for the English expression "CHArge DE MOve". Alternatively, this description can be made for any other load standard, for example "Combo CCS", or "Type 2—Mennekes".

The electric chain 3 comprises several electric lines (of different voltages) whose number, physical characteristics, lengths and cable sections are determined, depending on the embodiments, among others by the type of supplied current (alternating or direct), distances between objects, connection standards for vehicle charging, communication and IT necessary for the proper functioning of the charging system 1.

Where appropriate, provision can be made for each charging terminal to be able to charge the electric vehicle located in this location according to several distinct charging standards. In this case, it suffices to equip the chargers and electric chains for each standard.

In addition, it is possible to provide a charging system capable of supplying direct current or alternating current. In this case, the chargers 2, the electric chains 3 and the charging terminals 4, including the connection cables 11, the switching system 6 including switching devices 7 are adapted and equipped with the associated electrical equipment.

Additional information available to the control system 8, and used for establishing the mapping of connection, is the vehicle charge standard.

REFERENCES

Charging system 1
Charger 2
electric chain 3
Charging terminal 4

Charging location 5
Switching system 6
Switching device 7
Control system 8
Support 9
Box 10
Cable 11
Human-machine interface 12
connection interface 1313
switch 14
electrical wiring 15

The invention claimed is:

1. An electrical energy charging system for electrical devices, wherein the electrical energy charging system comprises:

at least a first charger and a second charger, each charger being equipped with a current converter, power supply components, and protection equipment;

an electric chain connecting the first charger and the second charger;

at least a first charging terminal, a second charging terminal and a third charging terminal, arranged along the electric chain, each charging terminal being electrically connectable to the first charger and the second charger via the electric chain;

a switching system adapted to alternately connect or disconnect each charging terminal to the first charger or to the second charger, enabling each charger to be instantaneously connected to one of said charging terminals;

wherein the electric chain is defined such that if the chargers and the charging terminals were simultaneously connected, they would be connected in parallel;

and a control system comprising:

a computerized receiving module suitable for receiving charging information from said electrical devices connected to said charging terminals, wherein said charging information comprises at least one identifier of each of said charging terminals;

a processor suitable for determining, repeatedly, from at least one rule stored and accessible to the processor, a mapping of connections between the charging terminals and the chargers, as a function of at least the received charging information and at least one other information chosen from:

instantaneous time information provided by a clock;

information on the arrival time of the electrical devices at the charging terminals;

information on the estimated departure time of the electrical devices from the charging terminals;

information on the estimated duration of presence of the electrical devices at the charging terminals;

information on the initial charge level of the electrical devices;

information on the desired final charge level for the electrical devices;

the control system being adapted to repeatedly control the switching system to electrically connect, according to the determined mapping of connections, one of the charging terminals to the first charger via the electric chain and another of the charging terminals to the second charger via the electric chain.

2. The electrical energy charging system of claim 1, wherein the processor is adapted to determine the mapping of connections from further information on the instantaneous charge level of an electrical device.

3. The electrical energy charging system according to claim 1, wherein the switching system comprises a switching device associated respectively with each charging terminal.

4. The electrical energy charging system according to claim 1, wherein the switching system comprises a plurality of switching devices, wherein each switching device is adapted to alternatively:

electrically connect the location associated with the switching device with the electric chain on the first side, electrically connect the location associated with the switching device with the electric chain on a second side, let the electrical energy pass without connecting the location associated with the switching device, open the electrical chain.

5. The electrical energy charging system according to claim 1, wherein the switching system comprises a switching device associated with at least one charger.

6. The electrical energy charging system according to claim 1, wherein the switching system comprises a switching device associated with at least one charger.

7. The electrical energy charging system of claim 1, wherein each charging terminal is connected to at most a single charger.

8. The electrical energy charging system according to claim 1, wherein at least one of the chargers is movable, the control system being adapted to repeatedly control the switching system for electrically connecting one of the charging terminals to the first charger via the electric chain and another of the charging terminals to the second charger via the electric chain taking into account the location of the chargers.

9. The electrical energy charging system according to claim 8, wherein the mobile charger is connected to the electric chain via a charging terminal.

10. A method of charging electrical devices with electrical energy by using an electrical energy charging system, wherein said electrical energy charging system comprises:

at least a first charger and a second charger, each charger being equipped with a current converter, power supply components, and protection equipment;

an electric chain connecting the first charger and the second charger;

at least a first charging terminal, a second charging terminal and a third charging terminal, arranged along the electric chain, each charging terminal being electrically connectable to the first charger and the second charger via the electric chain;

wherein the electric chain is defined such that if the chargers and the charging terminals were simultaneously connected, they would be connected in parallel;

a switching system adapted to alternately connect or disconnect each charging terminal to the first charger or to the second charger, enabling each charger to be instantaneously connected to one of said charging terminals;

wherein the method comprises:

a computerized receiving module of a control system receives charging information from said electrical devices connected to said charging terminals, said charging information comprising at least one identifier of each of said charging terminals;

a processor of the control system repeatedly determines, from at least one rule stored and accessible to the processor, a mapping of connections between the charging terminals and the chargers, as a function of at least the received charging information, and at least one other information chosen from:

instantaneous time information provided by a clock;

information on the arrival time of the electrical devices at the charging terminals;

information on the estimated departure time of the electrical devices from the charging terminals;

information on the estimated duration of presence of the electrical devices at the charging terminals;

information on the initial charge level of the electrical devices;

information on the desired final charge level for the electrical devices, the control system repeatedly controls the switching system to electrically connect, according to the determined mapping of connections, one of the charging terminals to the first charger via the electric chain and another of the charging terminals to the second charger via the electric chain.

11. A non-transitory computer readable medium comprising a computer program storing instructions which, when the computer program is executed by a computer, causes the computer to implement the method according to claim 10.

* * * * *